Jan. 31, 1967    L. M. NIJLAND ETAL    3,301,021
FLASH-LIGHT LAMP
Filed Oct. 5, 1964

INVENTORS
LOUIS M. NIJLAND &
JOHANN SCHRÖDER
BY
AGENT

United States Patent Office 3,301,021
Patented Jan. 31, 1967

3,301,021
FLASH-LIGHT LAMP
Louis Marius Nijland, Emmasingel, Eindhoven, Netherlands, and Johann Schroder, Aachen, Germany, assignors to North American Philips Company, Inc., New York, N.Y., a corporation of Delaware
Filed Oct. 5, 1964, Ser. No. 401,324
3 Claims. (Cl. 67—31)

The invention relates to a flash-light lamp comprising a closed, transparent bulb containing a solid substance, a gas and an ignition mechanism, said lamp supplying, when ignited, actinic radiation due to a chemical reaction between the solid substance and the gas.

The conventional lamps of this type comprise a bulb usually of glass, coated with one, two or more lacquer layers and containing a chaotic metal wool or foil, usually zirconium in the form of fibers and an oxygen atmosphere. The lamp comprises furthermore an electric ignition mechanism mainly consisting of a paste which can be exploded electrically. With a conventional structure a paste of a mixture of zirconium powder, lead dioxide ($PbO_2$) and nitrocellulose is provided on a tungsten wire which can be caused to glow electrically. When an electric current of sufficient strength is passed through the lamp, the paste explodes and causes the wire or foil to burn. The effective burning period of flash-light lamps is about 5 to 25 msec., depending upon the shape, structure and size. The color temperature is about 4000° K. The color temperature may be raised by providing a blue lacquer layer on the bulb of the flash-light lamp, so that it can be increased to about 5500° K. However, this is attended with a loss of light of about 30%.

The invention has for its object to raise the color temperature of flash-light lamps and to provide the possibilities of using a greater variety than hitherto in conventional flash-light lamps for the parameters determining the behaviour and the properties of flash-light lamps.

It has been found that this can be achieved by using a gas filling consisting mainly of fluorine or one or more volatile fluorine compounds which react with the solid substance at the ignition.

It has also been found that it is possible to produce a reaction between a solid substance and fluorine and one or more volatile fluorine compounds, the actinic light thus obtained having such a quantity and quality that it can be used as flash-light.

It has furthermore been found that such reaction can provide in many cases a higher color temperature than the corresponding reactions, in which oxygen is used instead of fluorine or a fluorine compound.

A particular advantage of the lamp according to the invention consists in that during the reaction the temperature in the lamp can rise materially due to the great stability of the fluorine compounds formed during the reaction, above the boiling point of said compounds and even above the boiling point of the corresponding oxides, which is conducive to the quality and the quantity of the emitted radiation.

Under the conditions prevailing in a flash-light lamp during burning the decomposition temperature of $Al_2O_3$ lies between about 5000° K. and 6000° K. This means that during the burning of aluminum the temperature cannot exceed a value lying between 5000° K. and 6000° K. The boiling point of $Al_2O_3$ lies at about 3000° K. After the termination of the combustion reaction the interior of the bulb is covered with a layer of $Al_2O_3$ which has condensed from the vapour phase.

The decomposition temperature of $ZrO_2$ is about 4500° K. It is stated in literature that the boiling point lies at about 5000° K. During the reaction between zirconium and oxygen the temperature can therefore not rise to an extent such that the $ZrO_2$ formed evaporates. After the termination of the reaction the $ZrO_2$ formed is found at the lowermost point of the bulb. In spite of the fact that the temperature in a zirconium flash-ligh lamp cannot rise during the reaction to the same height as in an aluminum flash-light lamp, the former yields a greater quantity of light with a higher colour temperature than the latter. This may be accounted for as follows. During the reaction between aluminum and oxygen a smaller amount of energy becomes available for radiation than with the reaction between zirconium and oxygen, since in the former case part of the energy is consumed by the evaporation of the $Al_2O_3$. In practice it is found that the temperature during the reactions do not differ much.

Under the conditions prevailing in a flash-light lamp after ignition many fluorine compounds of metals are found to be stable at about 8000° K. Therefore the temperature during the reaction with fluorine may be raised to values which usually cannot be attained by oxygen filled flash-light lamps. The boiling points of the fluorine compounds suitable for use are lying below about 3000° K., it is true, but the evaporation heat of these compounds is, in general, lower than that of corresponding oxygen compounds.

With the lamps according to the invention a deposit of the fluoride is formed on the whole bulb surface. This means that said deposit is formed by condensation of the vapour phase.

For practical reasons it is in many cases preferred to use a lamp which contains volatile fluorine compounds of metalloids, which compounds can react with the solid substance. Such a lamp does, in general, not require special precautions for avoiding premature reactions between the fluorine and parts of the lamp. Moreover the properties of the lamp and the nature and quantity of emitted light can be acted upon by means of the metalloids.

The choice of a suitable combination of the solid substance and the fluorine or fluorine compounds is chiefly determined by the energy released during the conversion, which energy must, in an absolute sense, be at a maximum.

This means:
(a) The heat of formation of the volatile fluorine compound which may be used must be at a minimum and preferably negative;
(b) The fluorine compound mentioned under (a) should preferably have a maximum number of fluorine atoms per molecule, inter alia with respect to the pressure of the gas filling;
(c) The heat of formation of the fluorine compound to be formed should be at a maximum;
(d) The stability of the fluorine compound formed should be at a maximum at the prevailing temperature;
(e) The evaporation heat of the compound formed during the reaction should be at a minimum.

Use is preferably made of volatile fluorine compounds of metalloids, the dissociation of which requires not more than 20 kcal. per fluorine atom under standard conditions. To wit at 1 atm. and 25° C., these are compounds such as nitrogen fluorides ($NF_3$, $N_2F_4$, oxygen fluoride ($OF_2$) and iodine fluoride ($IF_5$, $IF_7$) or mixtures of such compounds. Under standard conditions the formation enthalpy ($\Delta H$) and the dissociation energy per fluoratom of these compounds in kcal./mole will be:

|         | $\Delta H$ | Diss. energy |
|---------|------------|--------------|
| $OF_2$  | +7.6       | +3.8         |
| $NF_3$  | −27        | −9           |
| $N_2F_4$| −2         | −0.5         |

These values are not known exactly for $IF_5$ and $IF_7$ but they are small.

The gas may contain furthermore small quantities of volatile substances for example for modifying the combustion velocity. For example it was established that the combustion velocity could be increased by adding a minor amount of a gaseous or volatile hydrocarbon to the filling gas.

With the lamps according to the invention the pressure of the filling may be as usual 1 atmosphere or more.

The substance to be burned may, on the basis of the above considerations, be in the first place the elements of the third main group of the periodic system, the rare earth metals, the actinides, and the fourth sub-group of the periodic system and those of the fourth main group: silicon. Consequently, these are the elements boron, aluminium, scandium, ytterbium, lanthanum, cerium, and other rare earths, actinium, thorium, uranium, titanium, zirconium, hafnium and silicon. Moreover, combinations of these elements for example in the form of alloys or mixtures if desired with elements not associated with said group may be employed.

The practical use of some of said elements is restricted by the high price. This applies for example to scandium, ytterbium, the rare earths, actinium and hafnium.

Some elements readily permit of being formed into wires or foils, which can be accommodated in the lamp in the form of metal wool. This applies, for instance, to aluminium, zirconium and thorium.

As an alternative, a powder of the said elements and a binder may be used to form thin foils, which are introduced into the lamp in the form of long fibres.

It is also possible to use a mixture of a powder of for example boron or silicon and a binder for enveloping two electrodes provided with an explosive paste. By striking a spark between the electrodes the lamp can be ignited.

The choice of the ignition paste, if any, is determined in the first place by the fluorine compound of the lamp. During the ignition the temperature attained with this paste must at least be such that the fluorine compound is decomposed and the reaction between the fluorine and the solid substance is started.

The color temperature of lamps according to the invention is in many cases higher than with comparable lamps having an oxygen filling, so that said lamps may be used for color photography with daylight material without the need for deep-blue lacquer layers on the bulb. Therefore any desired rise in color temperature will produce a comparatively smaller loss of light than in the case of corresponding flashlight lamps having an oxygen filling.

The invention will now be described more fully with reference to the accompanying drawing and to the examples given below.

Figure 1:
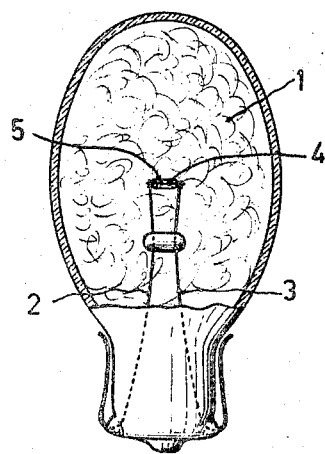
FIG. 1 shows a flash-light lamp having a diameter of 22 mms. on a scale double the actual size.

The flash-light lamp shown in FIG. 1 has a capacity of 7.75 cms.$^3$ and comprises 26 mgms. of zirconium in the form of metal wool 1. The lamp comprises furthermore the current supply conductors 2 and 3, which are interconnected by means of a tungsten filament wire 4. On this assembly there is provided a small quantity of an ignition paste 5. The paste consists of zirconium powder, lead peroxide and nitrocellulose; the last-mentioned component operates as a binder.

When the lamp is filled up to a pressure of 70 cms. with oxygen, 9600 lumenseconds is irradiated after ignition; the time between the ignition and the attainment of the maximum light flux (time to full peak or maximum time) amounts to about 20 msec. The color temperature of the irradiated light is about 4000° K.

Figure 2:
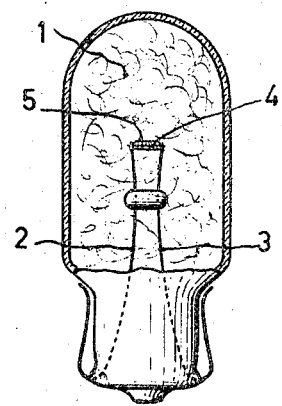
FIG. 2 shows a flash-light lamp having a diameter of 16 mms. on a scale twice the actual size.

The flash-light lamp shown in FIG. 2 has a capacity of 3.85 cubic cms. and comprises 11 mgms. of zirconium in the form of metal wool. The reference numerals designate the same parts as those of FIG. 1. The lamp is also filled to a pressure of 70 cms. with oxygen. After ignition the lamp irradiates about 3900 lumenseconds; the time between ignition and the attainment of the maximum light flux is about 20 msec. The color temperature of the irradiated light is also about 4000° K. The numbers mentioned above refer to lamps in a transparent structure.

*Example 1*

When a lamp as shown in FIG. 1 was filled with $OF_2$ to a pressure of 70 cms., the total quantity of produced light, after ignition, was 13,400 lumenseconds; the time between ignition and the attainment of the maximum light flux was about 40 msec., while the color temperature amounted to about 450° K. above that of the lamp filled with oxygen.

*Example 2*

When $NF_3$ was used instead of $OF_2$, while the pressure of the filling was the same, said values were 6500 lumenseconds, about 90 msec. and about 550° K. respectively.

*Example 3*

When a lamp as shown in FIG. 2 was filled with $OF_2$ to a pressure of 70 cms., said values were 5100 lumenseconds about 30 msec. and about 500° K. respectively.

*Example 4*

When a lamp as shown in FIG. 2 was filled with $NF_3$ to a pressure of 70 cms., said values were 2200 lumenseconds about 70 msec., and about 650° K. respectively.

*Example 5*

The lamp shown in FIG. 1 was filled with a mixture of $OF_2$ and $NF_3$. When the partial pressures of $OF_2$ and of $NF_3$ were 20 cms. and 50 cms. respectively, 9000 lumenseconds was irradiated after ignition; the time required for attaining the maximum light flux was about 70 msec. The color temperature was about 150° K. above that of the same lamp filled with oxygen of the same pressure. When the lamp was filled with a mixture of $OF_2$ and $NF_3$, the partial pressures being 50 cms. and 20 cms. respectively, 13,800 lumenseconds was irradiated. The maximum light flux was reached after about 50 msec. and the color temperature was about 500° K. higher than that of the same lamp filled with oxygen.

*Example 6*

If, instead of zirconium, an alloy of aluminum and magnesium (7%) was used in a lamp as shown in FIG. 2, a filling of 7 mgms. of this alloy and 95 cms. of $OF_2$ resulted in a light output of 4000 lumensec. and a maximum time of 35 msec. If the $OF_2$ was replaced by oxygen of the same pressure, the light output was only 2140 lumensec. and the maximum time was 17 msec. In the first case the color temperature of the emitted light was higher.

The time interval between the ignition of the flash-light lamp according to the invention and the instant at which the maximum light flow is attained (the maximum time) is too long for certain types of shutters of cameras. As stated above, the combustion speed may be raised and hence the maximum time shortened by adding to the filling gas a gaseous or volatile hydrocarbon compound. Such a reduction produces by surprise a generally higher light output of the lamp.

Suitable hydrocarbons to this end are the gaseous and volatile compounds of carbon and hydrogen of the gross formulae: $C_nH_{2n+2}$, $C_nH_{2n}$, $C_nH_{2n-2}$ and others, which comprise, per carbon atom, preferably at least two hydrogen atoms and which have, at about −30°, at least a vapor pressure of 1 cm. Also cyclic hydrocarbon compounds fulfilling this condition may be employed. Suitable compounds are inter alia methane, ethane, propane, butane, isobutane, n-pentane, n-hexane, n-heptane, and isomers; ethylene, propylene, butene-1, butene-2, isobutylene, pentene-1, 2-methylbutene-1, 3-methylbutene-1, hexene-1, and isomers; heptene-1 and isomers; allene, isoprene, benzene.

It is found, in general, that small quantities of these hydrocarbons are sufficient to affect the combustion speed materially. For each hydrocarbon it can be assessed by a few simple experiments with which quantity optimum results can be obtained. Usually a few centimeters of filling pressure suffices to attain the desired reduction of the maximum time.

With reference to the Examples 7 to 10 this effect will be explained more fully.

*Example 7*

If a lamp of the kind shown in FIG. 2 was filled with a gas mixture of $OF_2$ and $C_3H_8$ (propane) as indicated above, the results indicated in the following tables were obtained.

TABLE I

| Quantity of Zr in mgms. | $OF_2$ in cm. | $C_3H_8$ in cm. | Light output lumensec. per mgm. Zr | Max. time in msec. |
|---|---|---|---|---|
| 13.2 | 70 | | 385 | 30 |
| 13 | 70 | 0.25 | 385 | 25 |
| 12.6 | 69.5 | 0.5 | 400 | 20 |
| 12 | 69 | 1.2 | 445 | 9 |
| 11.5 | 68.5 | 1.5 | 450 | 7 |
| 11 | 68 | 2 | 390 | 5 |

*Example 8*

The $OF_2$ of Example 1 was replaced by $NF_3$ and the results obtained are indicated in Table II.

TABLE II

| Quantity of Zr in mg. | $NF_3$ in cm. | $C_3H_8$ in cm. | Light output in lumensec. | Max. time in msec. |
|---|---|---|---|---|
| 11 | 120 | | 3,640 | ca. 70 |
| 11 | 150 | | 4,180 | ca. 70 |
| 11 | 147 | 4 | 5,470 | 15 |
| 11 | 160 | 6 | 4,950 | 8 |

*Example 9*

Experiments with other hydrocarbons together with $NF_3$ in a lamp as shown in FIG. 2 yielded the following results:

| Quantity of Zr in mg. | $NF_3$ in cm. | Hydrocarbon | Quantity in cm. | Light output in lumensec. | Max. time in msec. |
|---|---|---|---|---|---|
| 11 | 147 | $C_3H_8$ | 4 | 5,470 | 15 |
| 11 | 147 | $CH_4$ | 6 | 3,130 | 40 |
| 11 | 147 | $C_3H_6$ | 3 | 5,560 | 14 |
| 11 | 147 | $C_6H_6$ | 4 | ca. 5,000 | 8 |
| 11 | 147 | $n-C_7H_{16}$ | 3 | 5,500 | 11 |

*Example 10*

A lamp of a capacity of 7.75 cms.³ of FIG. 1, containing 30.8 mgms. of zirconium, $NF_3$ to a pressure of 147 cms. and propane to a pressure of 4 cms. yielded, at the ignition, about 8800 lumensec. and the color temperature was 4600° K. The same lamp with a filling of 30.8 mgms. of zirconium and oxygen to a pressure of 151 cms. yielded about 9500 lumensec. but the color temperature was not more than 3900° K.

The values mentioned above are the averages of a number of measuring values.

The measurements were carried out on lamps having a transparent bulb.

What is claimed is:

1. A flash lamp comprising a sealed transparent bulb provided with a solid substance therein, a gas in said bulb, an ignition mechanism therein, said flash lamp providing actinic radiation upon ignition due to a chemical reaction between said solid substance and said gas, said gas being constituted of at least one volatile fluorine compound of a non-metal which compound reacts with said solid substance upon ignition, said compound requiring an energy for decomposition which per fluorine atom is not more than 20 Kcal./atom under normal conditions.

2. A flash lamp as claimed in claim 1 further comprising a gaseous or volatile hydrocarbon compound.

3. A flash lamp as claimed in claim 1 wherein said solid substance is zirconium and the fluorine compound is oxygen fluoride and/or nitrogen fluoride.

References Cited by the Examiner

UNITED STATES PATENTS

| 2,497,910 | 2/1950 | Ransley | 67—31 |
| 2,740,281 | 4/1956 | Honing et al. | 67—31 |
| 3,177,652 | 4/1965 | Lewis | 149—1 |
| 3,224,236 | 12/1965 | De Ment | 67—31 |

OTHER REFERENCES

Kit et al.: Rocket Propellant Handbook, The Macmillan Co., New York, 1960, pages 80–89, inclusive, and pages 96–100, inclusive.

FREDERICK L. MATTESON, JR., *Primary Examiner.*

ROBERT A. DUA, *Examiner.*